(12) United States Patent
Kaddoura et al.

(10) Patent No.: US 10,399,875 B2
(45) Date of Patent: Sep. 3, 2019

(54) WASTEWATER TREATMENT PLANT AND METHOD FOR TREATING WASTEWATER

(71) Applicant: ECOGLOBE GmbH, Berlin (DE)

(72) Inventors: Tariq Kaddoura, Berlin (DE); Moritz König, Berlin (DE); Julius Jacob, Berlin (DE)

(*) Notice: Subject to any disclaimer, the term of this patent is extended or adjusted under 35 U.S.C. 154(b) by 92 days.

(21) Appl. No.: 15/562,498

(22) PCT Filed: Mar. 30, 2015

(86) PCT No.: PCT/EP2015/056848
§ 371 (c)(1),
(2) Date: Sep. 28, 2017

(87) PCT Pub. No.: WO2016/155764
PCT Pub. Date: Oct. 6, 2016

(65) Prior Publication Data
US 2018/0093907 A1 Apr. 5, 2018

(51) Int. Cl.
*C02F 3/04* (2006.01)
*C02F 1/24* (2006.01)
*C02F 3/00* (2006.01)
*C02F 3/12* (2006.01)

(52) U.S. Cl.
CPC .............. *C02F 3/006* (2013.01); *C02F 1/24* (2013.01); *C02F 3/04* (2013.01); *C02F 3/043* (2013.01); *C02F 3/046* (2013.01); *C02F 3/1242* (2013.01); *C02F 2201/003* (2013.01); *C02F 2203/002* (2013.01); *C02F 2203/006* (2013.01); *C02F 2209/001* (2013.01); *C02F 2209/03* (2013.01); *C02F 2209/40* (2013.01); *C02F 2209/42* (2013.01); *Y02W 10/15* (2015.05)

(58) Field of Classification Search
CPC .......... C02F 3/04; C02F 2209/42; C02F 3/00; C02F 1/006; C02F 3/10; C02F 2209/03; B01D 21/0012; E03B 1/04; E03B 3/00; E03B 3/40; E03F 1/00
USPC ..................................... 210/151; 405/41, 37
See application file for complete search history.

(56) References Cited

U.S. PATENT DOCUMENTS

| 5,132,025 A | 7/1992 | Hays |
| 2002/0179511 A1 | 12/2002 | Wofford |
| 2012/0267325 A1 | 10/2012 | Kaddoura et al. |
| 2014/0076788 A1 | 3/2014 | Miyata et al. |

(Continued)

FOREIGN PATENT DOCUMENTS

| DE | 300015 | 5/1992 |
| DE | 10010109 A1 | 9/2001 |
| EP | 0738687 A1 | 10/1996 |

(Continued)

*Primary Examiner* — Claire A Norris
(74) *Attorney, Agent, or Firm* — Smartpat PLC

(57) ABSTRACT

The invention concerns a wastewater treatment plant and a method for it. The plant comprising at least one main reactor module (30) having a plurality of stackable filter-modules (50), each filter-module purifying wastewater independently by being individually charged batchwise with wastewater. The wastewater is discharged on each filter-module by means of a deflector (44) referenced to a filter-module (50), the deflector creating a back pressure in dependency of the gravity-flow-force of the wastewater leading to that the wastewater is spilled from the deflector (44) in an angle of discharge relative to a horizontal plane evenly onto every independent filter-module, respectively.

15 Claims, 7 Drawing Sheets

(56) References Cited

U.S. PATENT DOCUMENTS

2014/0263000 A1 9/2014 Lee et al.

FOREIGN PATENT DOCUMENTS

| FR | 582932 A | 12/1924 |
| FR | 2495183 | 6/1982 |
| WO | 03070873 | 8/2003 |
| WO | 2011009954 A1 | 1/2011 |

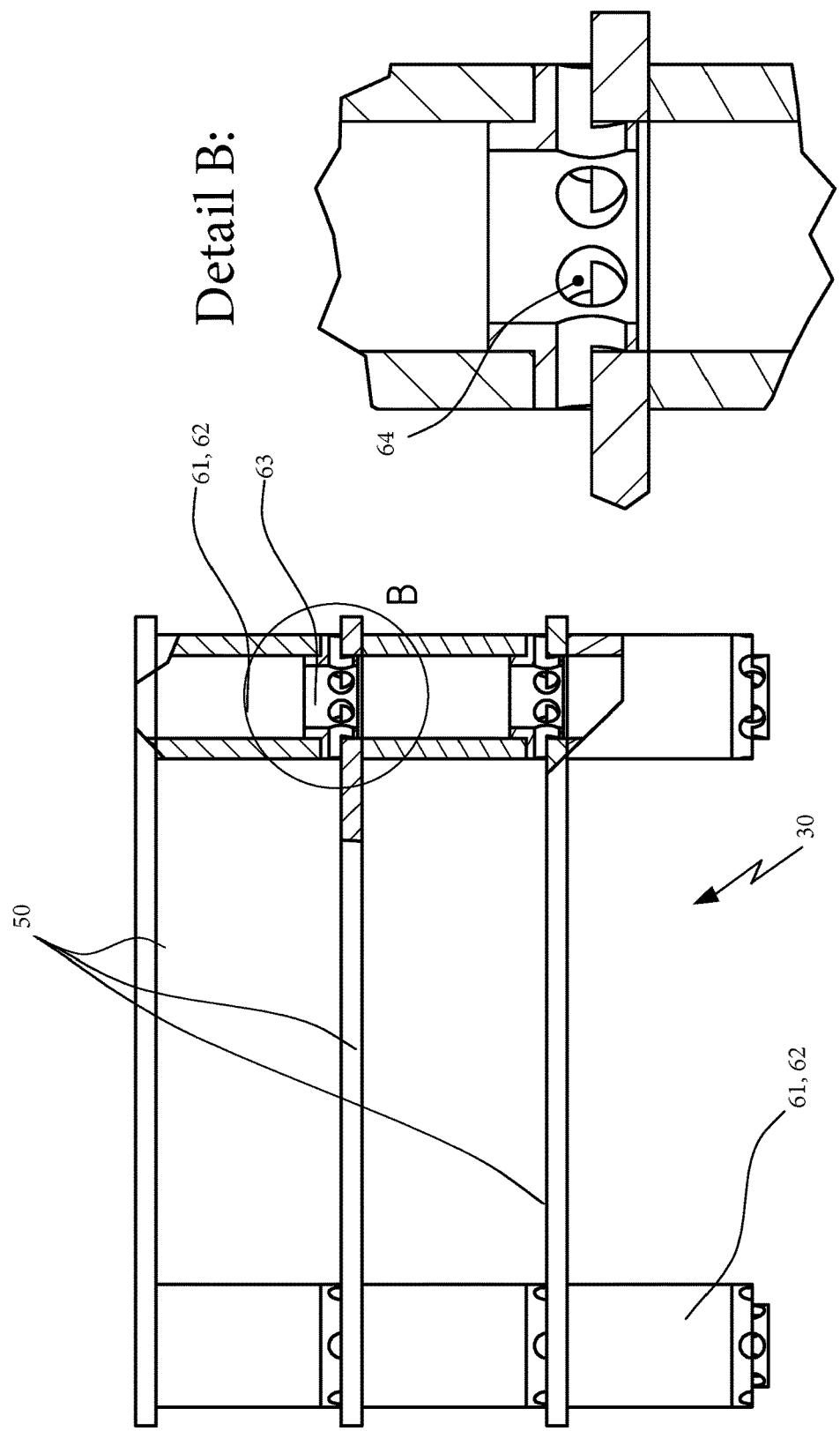

WASTEWATER TREATMENT PLANT AND METHOD FOR TREATING WASTEWATER

FIELD OF THE INVENTION

The present invention relates to a wastewater treatment plant, in particular a plant for treating wastewater by means of a plurality of filter-modules and a method concerned therewith.

BACKGROUND OF THE INVENTION

In order to reduce the impact on the environment and to protect groundwater and where it is intended to reuse wastewater and to save money, it is necessary to purify contaminated water. This type of treatment/purification can be achieved by means of mechanical and biological treatment of the wastewater. For this purpose, centralized sewage treatment plants are known which at a central location effect the purification of wastewater from a large number of households or consumers. Local decentralized plants are also known which permit provision of a wastewater treatment plant for individual or a plurality of interconnected households. The small construction size thereof permits only a small flow rate volume of wastewater per unit of time, however by reason of their size and because it makes the use of sewers obsolete and due to their relatively uncomplicated structure they can be provided set-up cost-effectively. The present invention relates in particular to such wastewater treatment plants which are to be set up locally. Those wastewater treatment plants can be formed as so-called planted or unplanted soil filters which, for biological purification, utilise layers of sand, gravel or a mixture thereof and optionally can comprise a covering of vegetation. The substrate serves as a carrier material for the biofilm of the microorganisms.

The surface of planted and unplanted filters, through which the wastewater must penetrate for purification purposes, is dependent upon the desired wastewater volume, which is to be purified, per unit of time. Compared to so-called technical plants (e.g. SBR-methods, fixed bed systems, membrane systems) planted and unplanted soil filter systems take up a relatively large amount of surface area. In order to solve this problem, subterranean, substantially shaft-like wastewater treatment plants are known, in which the purification of wastewater is performed with an increased amount of device-related outlay. Specific approaches for the creation of local wastewater treatment plants are known e.g. from DD 300 015 A7, in which a reed bed is proposed which achieves improved ventilation through different filter-modules. The wastewater to be purified flows consecutively through these filter-modules. EP 0 738 687 A1 likewise discloses a sewage treatment plant which comprises individual filter elements, through which water to be purified flows vertically in succession. A similar plant is taught by DE 100 10 109 A1 which discloses modular filter systems, wherein the wastewater can flow through the individual filter modules for purification.

At least document WO 2011/009954 discloses a wastewater treatment plant having a plurality of filter-modules disposed one under the other, wherein each layer is connected to an intermediate store such that wastewater can be individually fed to a filter-module.

However, the problem with these wastewater treatment plants is either that in order to purify a specific quantity of wastewater, the wastewater must initially pass through a plurality of filter-modules before it can be made available again and that makes a huge area necessary or the independent activation of a single filter-module needs a lot of moving parts which do need a precise service and are costly.

AIM OF THE INVENTION

The object of the invention is to provide a wastewater treatment plant and a method for treating wastewater, by means of which a purification can be achieved rapidly and reliably by the utilisation of biological and/or biochemical processes in a convenient and cost-effective manner and with a structurally simple and flexible construction.

SUMMARY OF THE INVENTION

The above object is achieved by a wastewater treatment plant according to claim 1. Further, to supplement the invention, there is also provided a method in accordance with the invention for treating wastewater, in particular for purifying wastewater according to claim 11. Convenient embodiments are disclosed in the subclaims, respectively.

The basic motivating thoughts for the present invention have been to gain an even distribution of wastewater within an air-space over and onto several filter-modules to be charged therewith timely parallel to each other and in a controlled manner within a reactor module, while being able to control the charging time and the charging amount with wastewater. Further, by installing or developing specific technical devices and by productively arranging the single components of the plant, the maintenance of such plant is minimized. Devices which have been assessed to be avoided as far as possible are for example valves, nozzles or pumps including moving components. Resulting therefrom, the invention makes use of gravitational force only for both the transport and the distribution of the wastewater to the respective filter-modules. Basic idea of the present invention is thus a free-fall feeding system of a multi-level biofilter wastewater treatment plant which additionally is accomplished as a compact, structurally simple and flexible construction and which is to be installed on site as an integral assembly.

To this end, the inventors have found out that a sufficiently strong gush of wastewater is needed to realize the aim of gaining an even water distribution over and onto all the filter-modules when omitting any device for transportation or distribution of the wastewater within the plant. Only by means of a sufficient strong gush of water the necessary flow velocities can be achieved which are needed for an optimal ejection and distribution by spilling or sprinkling the wastewater onto the respective filter beds. Contradictory to a continuous feeding, the present invention means a wastewater treatment plant for a slack flow operation, i.e. to charge the filter modules in a time-controlled or quantity-controlled way, i.e. a batchwise charging. To this end, the wastewater can start from a feed-reservoir of the plant, wherein a static pressure of the flow of wastewater is created by means of the filling level of the feed-reservoir along with the gravitational force aimed by a declining slope-line from the feed-reservoir towards the main reactor module. In other words, the feed-reservoir shows a higher geodetic altitude relative to the reactor module. The dynamic pressure aimed therewith is determined such that the wastewater is discharged on each filter-module by means of a deflector referenced to a filter-module, the deflector creating a back pressure in dependency of the gravity-flow-force of the wastewater and therewith a predetermined deflection leading to that the wastewater is spilled from the deflector in an angle of discharge relative to a horizontal plane evenly onto every independent filter module, respectively.

The plant in accordance with the invention can be installed in a space-saving manner, since all of the filter modules are disposed one over or under the other within a reactor module and the wastewater treatment plant can thus be lowered into the ground and does not take up any space above the ground surface. However, it can even be installed also above the ground or can be set up in internal spaces, such as e.g. garages or cellars.

To sum up, the invention realizes the advantages of
- a maximum treatment surface for a wastewater purification while simultaneously reducing the needed area for it;
- making benefit of gravitational force for the charge of wastewater to the filter modules and therewith omitting electrical and mechanical devices in the running path of the wastewater;
- an adaptation in view of amount of charge and time of charge during operation of the plant;
- a possibility of specifically charging individual filter modules or reactor assemblies.

A. The energy causing the wastewater flowing is gained by the difference of the geodetic altitude between a feed-reservoir and a reactor module. A static pressure is created in that the starting level of wastewater from which it is conveyed to the filter modules is defined in a feed-reservoir which functions for storing and buffering as well. Said starting level is higher in altitude than any of the filter-modules and is defined as a minimum water-level within the feed-reservoir. When the minimum level is reached, a sufficient amount of wastewater and a sufficient static pressure is present for creating a gush of wastewater to the reactor module(s). The feed-reservoir itself does therefore not have to be arranged above the plurality of filter-modules, but it is the definition of the minimum water-level which is decisive for that a sufficient pressure for transporting wastewater from the feed-reservoir to the feed-element is created. In addition to the minimum water-level there is also defined a maximum water-level within the feed-reservoir defining together with the minimum level a comfort volume of wastewater standing for the normal convenient working capacity of the plant—although the feed-reservoir can nevertheless be dimensioned to receive additional wastewater for buffering.

The feed-reservoir additionally can function as a primary treatment-basin for a sedimentation of solid particles which can be pumped out from time to time, if necessary. To sum up, the feed-reservoir optionally also aims the functions of buffering the wastewater in it and/serving as part of a primary treatment container.

B. According to the invention the wastewater treatment plant comprises a feed-valve which is provided between the feed-reservoir and a feed-element (for the feed-element see item C. below) making thus a batchwise feeding of wastewater to the feeding element possible, wherein however the transport of wastewater as such is still accomplished by gravitational force only. Said valve is according to an advantageous embodiment a controllable valve. However, even automatic-valves are suitable which open and close automatically.

In order to realize a valve omitting any maintenance-intensive parts, the feed-valve is according to an advantageous embodiment an overflow valve with a multiple baffled flowpath. The feed-valve is of a construction according to which several pipes are interleaved with specific height- and diameter dimensions so that a plurality of overflows is provided in it. Furthermore a pipe can be integrated, which reaches to above the maximum water level and serves for both aeration and as an emergency overflow (see exemplifying embodiment in FIG. 5). It is the idea of the inventors to create a valve including an overflow pathway and to add an air-inlet for controlling the valve—therewith realizing the purpose of creating a batchwise charging. The new valve of the inventors could also serve as a convenient overflow-valve when being arranged at a suitable site. While an overflow valve as such is normally arranged in a container or basin to feed only that amount of water which rises above a predetermined water level, the entry of the valve of the present invention is according to an advantageous embodiment arranged below or at the site of the minimum water level of the feed-reservoir. This means that the valve itself is not arranged such to exercise a function for a passage in dependency of the water level of the feed-reservoir, but it is opened or closed by releasing or filling air through the air-inlet, thereby controlling an air buffer in the valve which creates or blocks the hydraulic connection through the valve.

According to an advantageous embodiment the feed-valve is of a construction according to which several pipes are interleaved with specific height- and diameter dimensions so that a plurality of overflows is provided in it.

For controlling the valve there is an air-inlet provided through which air may enter or leave the valve and by means of which an air cushion can be created in an uppermost flowpoint of the valve construction. For closing the valve, air is blown into the air-inlet by means of a ventilation device (pump; compressor; pressure accumulator or similar), meaning to realize an air-barrier the pressure of which must be sufficiently high compared to the water pressure coming from the feed-reservoir. For opening the valve, the air is sucked out of the air-inlet.

To determine and to regulate the absolute water-level within the feed-reservoir and to therewith determine the volume of water passing through the feed-element could be realized by a second feed-valve being arranged at the inlet site of the feed-reservoir.

It is to be noted, that it is the filling volume of the feed-reservoir being inter alia decisive for the pressure of the water on the way to the modules (a further component is the declining slope towards the feed-valve and/or from the feed-valve to the modules causing an additional dynamic pressure). For opening the valve said air-barrier is withdrawn by suction so that wastewater can then flow due to the total pressure of the water. The risk of being choked or clogged by solid substances entrained in the wastewater is minimized when implementing the multiple baffled valve.

At least, in case one measures the air pressure within the feed-valve for realizing a closing state, one can conclude the level of wastewater within the feed-reservoir due to the static pressure of the air cushion, the volume of wastewater within the feed-reservoir causes. Further, it is optionally possible to arrange a flowmeter at the site of the feed-valve to measure the flow volume passing through the valve. Thereby it would be possible to deduce the dynamic pressure.

It is to be noted that the feed-valve of said construction can also function as an emergency overflow even when not installing the optional pipe, which would reach above the maximum water level and would serve for both aeration and as an emergency overflow (see embodiments of FIGS. 5 & 6): In case the water level within the feed-reservoir rises such high that the pressure resulting therefrom exceeds the air-pressure caused by the air-cushion for closing the valve, the wastewater would pass through the feed valve and would entrain said air-cushion towards the reactor module(s).

The above mentioned construction of the feed-valve can be a single structural unit or can be put together by means of several components. In this respect it is for example possible to make one part of the valve being fixed as a structural unit with either a part of the feed-reservoir or a part of the feed-element. This reduces the workload of service-maintenance.

Attached to the valve or separate from it there may be a ventilation pipe which has its entry above the maximum water level of the feed-reservoir and which is connected to the valve in a way that allows an exchange of air between the feed-reservoir and the feed-element or the reactor, while the feed-valve is at the same time closed for the passing of water. This is important for making aerobe conditions in the filter-modules possible. So, an improved supply of oxygen to the microorganisms located in the substrate is achieved. There can be an importance for the supply of atmospheric oxygen to the substrate space, since it is required for the methabolisation of the microorganisms in the substrate. From the surface of the filter substrate by both diffusion and by being drawn in as the waste water seeps through.

Requirements which are fulfilled for the above proposed feed-valve is
 a reliable closing
 and a bypassing of a strong gush when being opened, meaning therewith a sufficient cross section;
 small in design to be able to put it through a manhole cover;
 and no need for moving parts
 an emergency overflow (optional)
 no electrical parts
 a reliable design regarding clogging
 easy installation and maintenance.

In the preferred embodiment also an aeration through the valve is facilitated, while it is closed for water. The aeration is described in the following:

Preferably for the entire system a ventilation concept is provided. In particular, the filter levels, but also the primary treatment needs a steady and gentle ventilation. Ambient air enters at the first pre-treatment chamber (e.g. through a manhole cover providing this) in the system. From there, the air transport essentially takes the same path through the system, such as the hydraulic flow path. From the feed reservoir to the filter modules, the air can pass in different ways.

In a preferred embodiment, the feed-valve is designed such that it allows passage of air, while it is blocked for water. This allows the air to reach the upper airspace of the filter-modules from the feed-reservoirs air space through the feed-valve and the feed-element. Alternatively, the feed-element can be connected with a suitable air supply from the feed-reservoir separately from feed-valve. Still alternatively, a suitable air supply can be placed directly into the filter-modules (from the feed-reservoir or from elsewhere). In effect, the supply of the filter modules with fresh air is prepared in a suitable manner. Thereby the air supply occurs from the air space of the feed-reservoirs, as can also be the removal of air into the air space of the feed-reservoirs.

In another preferred embodiment, the air from the air space of the filter modules passes on in the pore structure of the filter substrate in the drainage layer of the filter levels and from there further into the drainage storage container. From the drainage storage container, the air passes further into the inspection chamber and from there through an exhaust way out.

The drive for this air movement can take place through a suitable height difference of air inlet and outlet (chimney effect), it can be driven as well by a fan. The air movement may also take place in the opposite direction, as described above. The ventilation concept can also be done only in parts, as described above. In particular a ventilation concept may be implemented for the sections including from the primary treatment to the airspace of the filter levels. It can also be implemented only a ventilation concept for the airspace of the filter levels.

C. As regards the inventive feed-element being provided downstream of the feed-valve, it shows at least one downspout for forwarding the water by gravitational force. This force can be enhanced by that the water from the feed-reservoir flows down from a higher altitude. Said at least one downspout leads to a deflector associated with a respective filter module. Said deflector aims to divert the flow of wastewater for spreading it evenly over the reactor surface. This means that the deflector creates a launch-angle for the wastewater leaving the feed-valve. To this end, the deflector can optionally include a deflector-edge enhancing this goal.

The deflector can aim to create a flow resistance for all further downspouts located below in case the deflector protrudes into the downspout and into the downwards directed wastewater flow. Further, the deflector is able to create an impact pressure at the gap of outlet. However, it is a suitable aim of the deflector to mean a rather low resistance for leaving water at the leaving site since then an evenly distribution can be guaranteed. At least, the deflector can be used being the structural unit linking feed-element-components together.

While it is possible to install a manifold which connects the feed-valve with each deflector of every filter-module separately, a convenient solution means a single downspout to which each deflector for any module is connected, respectively.

Object of the feed-element is to distribute the wastewater evenly in any filter-module independently from each other. The number of filter-modules stacked one over the other is variable. The advantage one gains by charging the filter modules individually resides in particular in that the wastewater is distributed over a larger area, thus achieving a maximum use of a biologically highly active filter surface. Furthermore, this results in a greater flow rate of wastewater per unit of time, since wastewater is filtered in parallel in a plurality of filter modules and the filtered wastewater can be made immediately available after purification. The modular construction renders it possible to produce and assemble the wastewater treatment plant in a simple and cost-effective manner and it can be adapted without more significant outlay to suit the respective wastewater treatment requirement.

For every filter-module there is a respective deflector comprised by the feed-element. Between the downspout and the deflector there is either a continuous or perforated gap so that wastewater can exit the downspout onto the deflector. The gap is designed according to the desired amount of wastewater flowing onto the deflector. According to a best mode, the gap can be adjustable to adapt the amount of wastewater flowing onto the deflector. At any outlet where wastewater exits the downspout a dynamic pressure has to be created to be strong enough to distribute the wastewater into the respective filter module. Due to the specific and different altitude of each filter-module there is a specific pressure gradient associated with each filter-module. To now distribute the same amount of wastewater in every filter-module and to distribute said wastewater evenly in a respective plane, basic parameters have to be adapted for the respective filter-module as for example the size of gap between downspout and deflector, flow resistance for the wastewater as also the angle of ejecting the wastewater away from the deflector. Further, to make the gap optionally discontinuous means to be able to give the flow exiting the downspout a predetermined shape.

To this end, there are three possible ways of realization of a convenient ejection:

1. The size of the gap is varied from the uppermost deflector to the lowest one and therewith the flow cross-section is varied to adapt the flow of volume. In this case a different velocity has to be taken into account for each altitude of different filter-modules. Therefore, the angle of ejection has to be adopted by means of the edge of the deflector for every filter-module to create a constant distance of ejection.

2. The flow resistance can alternatively be varied by installing specific resistances like flat washers within the downspout. By means of these washers the total pressure can be adopted in each module, respectively, meaning that the size of the gap and even the angle of ejection can be maintained constantly.

3. The flow resistance can be also varied within the downspout by installing variable resistances like variable throttles, which can change their resistance in dependency of the flow velocity.

According to an advantageous embodiment, the feed-element and the feed-valve (see item B.) can be a single structural unit. This can mean that the feed-valve is integrated at top of the feed-element.

D. Taking reference to the filter modules where the biological purification takes place the sum of all module elements forms a main reactor module. The number of modules is optional, while it is rather the size of the plant being decisive for the number and size of the modules. The wastewater fed to a respective filter module comes directly from a wastewater line of the wastewater feed-reservoir and not from a preceding filter module located above. Equally, the water filtered in this filter module is not fed to a further, underlying filter module, but rather is fed directly to an intermediate store, wherein the intermediate store is a drainage collecting tank (see later on item E.). An essential feature thus resides in the fact that the feeding to the respective filter module and the purification and discharge from the filter module into an intermediate store are accomplished without the interconnection of a further filter module. However, it should not be ruled out that further filter-modules disposed in the wastewater treatment plant are connected fluidically to each other such that the water which is already filtered by a filter-module is then fed to a further, underlying filter-module. This means that wastewater can optionally be fed in every second level or filter-module. In this embodiment, the filter-module comprises a perforated base plate, through which the water already filtered by the overlying filter-module can be dripped onto the filter-module disposed below it. This entity of a plurality of layers being stacked and connected together overtakes the function of a single filter-module said before. In other words: A single filter-module can be enlarged by functionally connecting several filter-modules together. This may be the case for very polluted water which needs a longer duration of stay within a biological treatment phase, and different varieties of microorganisms that will develop in the subjacent filter-module due to the different quality of the water that is being fed into this layer.

Alternatively or furthermore it is possible to connect a plurality of reactor modules together, each comprising multiple filter-modules—where this connection is communicating as well, thus making use of gravitational force, only.

According to an advantageous embodiment, a single filter-module consists of three sections: the top section is an air-section within which the wastewater coming from the feed-reservoir via the feed-valve is spilled or sprinkled by means of the deflector referenced to the filter-module in question. In addition, the air-section serves as a supply channel and a buffer reservoir for aeration.

The second section refers to the filter substrate. It should be formed by a suitable material, such as e.g. sand, gravel, synthetic substrates or a mixture thereof, which is suitable to be a carrier media for microorganisms. In such a substrate layer, mechanical, chemical and biological processes are performed for purifying the wastewater. At the bottom of this section there is a geotextile with a mesh size small enough to prevent the substrate from permeating. Said texture realizes that the filtered water is able to drip down into the third section.

The third section, i.e. the lowermost one forms a drainage layer which gathers the purified water and conveys the same to the intermediate store like the drainage storage container (see item E.). This is realized by a mesh cloth which is stable enough to support the overlying section and thus creates a mainly air filled space. Here again, generally no pump is needed to discharge the water from the third section since one benefits from utilising the gravitational force. In this case, the uppermost maximum water level within the drainage storage container must be lower than the lowest drainage layer of the reactor module. To sum up, one utilises only the gravitational force of the water to transport it away to the intermediate store, e.g. via obliquely extending outlets which terminate above the drainage storage container. Therefore, in the wastewater treatment plant in accordance with the invention, various functions, such as e.g. feeding, discharge and ventilation, are integrated in one simple-to-handle assembly of feeding reservoir, feeding valve and the reactor module consisting of a plurality of filter-modules.

In one particular embodiment, vegetation can be planted in the uppermost layer of the wastewater treatment plant. This uppermost layer thus forms in part a reed bed or vegetation filter system. Even on the filter-modules or modules disposed below vegetation might be planted, provided that the light, plants require for assimilation is made available.

As regards the fixation of the filter-modules, there is provided a housing accommodating all of them, meaning the main reactor housing, thereby sealing the main reactor module with respect to the outside environment. The outer wall provides a seal in particular with respect to the ground if the wastewater treatment plant is sunk into the ground. Any filter-module can be individually fixed at said wall of the housing.

According to a best mode as found out by the inventors on every filter-module layer there are three vertical pipe sections, fulfilling three functions:

1. support for statics: every filter-module is supported by these pipe-sections. This is even true for the lowest module, meaning the pipe sections for the lowest module are placed at the bottom of the reactor-module to support the lowest modules, respectively. And even the uppermost ones of the filter-modules comprise these pipe sections to be able to support the feed-reservoir when being placed above.

2. drainage: the floor plates of the filter-modules are perforated where the pipe sections contact the same. Therewith, the filtered water can run off in a downward direction from any filter-module. When putting a pipe section onto said floor plate, an intermediate spacer can be provided guiding the pipe section on its correct site. In this case, said spacer realizes the run off the wastewater also from one upper pipe section to the next pipe section arranged below.
3. aeration and air-removal: By means of the pipe sections an aeration as also an air-removal is realized: from the feed-reservoir (and possible preceding stages) through the feed-element, into the filter-modules, through the pores of the substrate, through the drainage-layer, and through the pipe sections further on, for example into a drainage container and a technics-module.

Additionally or alternatively, there is provided at least one vertical pipe connecting those drainage layers of filter-modules which are stacked over the other. In the latter case, the filter-modules can be fixed at said at least one drainage pipe. Additionally, even the geotextile with a mesh size small enough to prevent the substrate from permeating can be fixed at said pipe to make the installation work more easy.

E. Taking now reference to the drainage storage container of a preferred embodiment being arranged downstream the main reactor module, all of the water gathered by any of the drainage sections of each filter-module is received therein. In case that more than one reactor module is used, a common drainage storage can be formed by enabling the hydraulic communication of drainage storages below each module. To be able for omitting a pump the maximum water level of the drainage storage container has to be lower in altitude than the lowest drainage section of the lowest filter-module. The drainage storage container therefore functions as a buffer for the purified and filtered water. From the drainage storage container the water can be hydraulically directed back to the starting phase of treatment. This can either be an optional primary treatment (see below item I.), a reintroduction into the feed-reservoir or even the direct introduction into the feed-element.

F. According to a preferred embodiment of the invention there is an inspection chamber which is in the best way a shaft being imbedded in the ground. The inspection chamber receives water from the drainage storage container and thus again serves as a buffer for the purified water. Within said inspection chamber the common water level of the drainage storage container and the inspection chamber is measured and the purified water can then be pumped out. From said inspection chamber the water can be directed to facilities for disposal, re-use or more extensive purification, e.g. in a form of a recirculation, denitrification, dephosphating or disinfection. The denitrification stage, dephosphating stage or disinfection stage can be formed as additional modules which are formed either inside the modular system of the wastewater treatment plant or they can be disposed outside the plant.

According to an advantageous embodiment, a disinfection procedure takes place within said inspection chamber, where the disinfection procedure is performed by means of a UV-radiation, or for example by diaphragm technology, ozonisation or sand or quartz filtering.

A further main object of the inspection chamber however is to accommodate a technics-module:

G. There is an integrated technics-module according to a preferred embodiment which unites the majority of the measurement and control technology along with additional hydraulic components in one single structural unit. Due to that, suppliance, installation and maintenance become very easy. This means in other words that the functionality of only a single element, i.e. only the integrated technics-module has to be watched and guaranteed for. The technics-module comprises preferably all needed pumps, ball valves and magnetic valves for hydraulic and pneumatic components, ventilators etc., either the control and/or the communication module, as also any sensors which are needed. In addition, such a technics-module when encompassing all electrical and electronic or sensitive components can be prefabricated before installation. Conveniently, the housing of the technics-module can be made watertight, so that all elements inside are well protected.

In the following, components of a preferred embodiment of the technics-module are elucidated, which can be installed as single pieces separately within the technics-module or in combination:

One component of the integrated technics-module is a pressure accumulator. Said accumulator realizes to feed air into the feed-valve as also pumping air out of the same. To realize said function, the pressure accumulator comprises a pump of any known type.

Within the technics-module there can be optionally a disinfection unit, too, e.g. UV-disinfection, membrane technology, ozonisation or electrolytic disinfection. Subsequent of the purification by the filter-modules the wastewater will then be disinfected. However, if an amount of wastewater which is received by the inspection chamber will be recirculated or transported to the dephosphating stage, then the disinfection stage is not activated. The disinfection is preferably used as a final treatment step of the plant. Thus it is possible to intermediary switch the disinfection stage off. A maintenance can be determined by means of operating hours of the disinfection device and/or of test samples of treated water. In case of a failure or break down of the disinfection stage an electric feedback should be given.

The industrial process measurement and control equipment is located within the technics-module, while it is also possible that parts of them are connected to it from outside. This equipment encompasses the sensoric to determine several water-level, the control of pumps, the technique to control different flow paths and the control for the optional UV-stage. In case further purification or disinfection stages are present, the control of it is even included within said technics-module.

At least there is a control logic handling the data values and the operational states of the plant. By means of a manual or automatic inspection monitoring, the data of the control logic can be exchanged, while the plant therewith can be also remote controlled. According to a further preferred embodiment there is a control module handling a colmation which occurs when a filter-module is for example clogged by wastewater particles or due to microbial activity or is overloaded by heavily polluted wastewater. In case of colmation the filter-module does no longer function properly. It is then necessary to exclude a colmated filter-module to leave it for regeneration for a predetermined time period or to exchange the filter-module in case of severe colmation. Therefore, it is very helpful to recognize a colmation at an early stage to avoid the above intensive maintenance. To this end, the colmation-control encompasses a recognition-system: charging of the several reactors or filter-modules happens successively. After having charged a specific reactor, a predetermined time period will be lapsed before charging the next reactor. This is ensured by an appropriate control of the feed-valve. After having charged one reactor in question, one awaits the wastewater dropping down from the respective filter-module substrate into the drainage layer and further on into the drainage storage container and the inspection chamber. The time window after which the next reactor is charged has to be chosen such that a main amount of the filtered water has been already received by the drainage storage container. During said waiting period there is an exact water-level measurement, showing the dynamic of the raising water level within the drainage storage container. This drainage-dynamic is allocated to the reactor in question and can be compared with previous measurement data of said reactor. Storing and comparing these data constantly leads to a very reliable and significant assessment of the state of the reactor. In the result, a colmation can be very easily recognized in a very early state.

According to a specific embodiment each filter-layer of a single filter-module or reactor is equipped with a respective valve. Therewith it is possible to charge any filter-layer separately and individually leading to that colmation can be examined and recognized for each filter-layer separately.

H. According to an advantageous embodiment, there is integrated a dephosphating stage within the wastewater treatment plant. Said dephosphating stage can be controlled selectively. The container in which said dephosphating is realized is filled with iron swarf which is able to bind the phosphor. A respective dephosphating container is connected to the technics-module from which the filtrate can be withdrawn for being fed to an external effluent. Further, as said above, there can be a recirculation from the inspection chamber accommodating the technics-module back to the feed-reservoir.

Finally, with the aim of a denitrification, there is a further alternative to feed the content of the inspection chamber to a primary treatment which is arranged upstream the feed-reservoir:

I. An optional primary treatment of the inventive wastewater treatment plant can be arranged upstream the feed-reservoir and conventionally comprises three pre-purification stages, i.e. compartments being connected in series. These primary treatment compartments do include a sedimentation of solid particles as also a flotation of floating substances. Due to a specific volume of any of these compartments they do also function as a buffer for the wastewater treatment plant.

In case of a dephosphating stage being present, too, there is an overflow from the dephosphating to the primary treatment.

DETAILED DESCRIPTION OF AN EMBODIMENT

In the following the invention is elucidated with reference to the drawings in which FIG. 1 shows the operative concept of a feed-reservoir, feeding valve and main reactor with details of the feeding element including deflectors;

Figure 5:
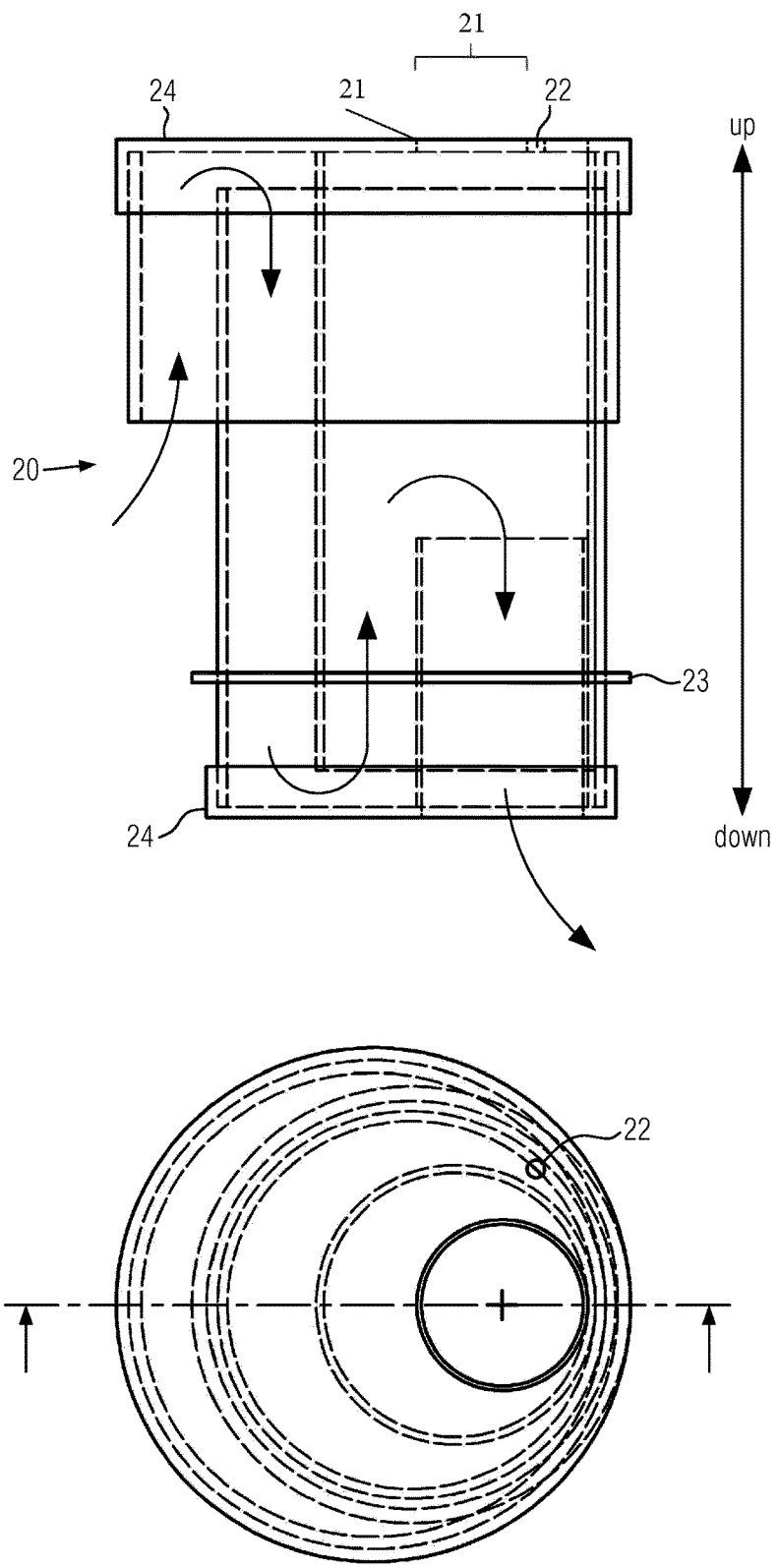
FIG. 5 shows an exemplifying embodiment of a feed-valve.
Figure 6:
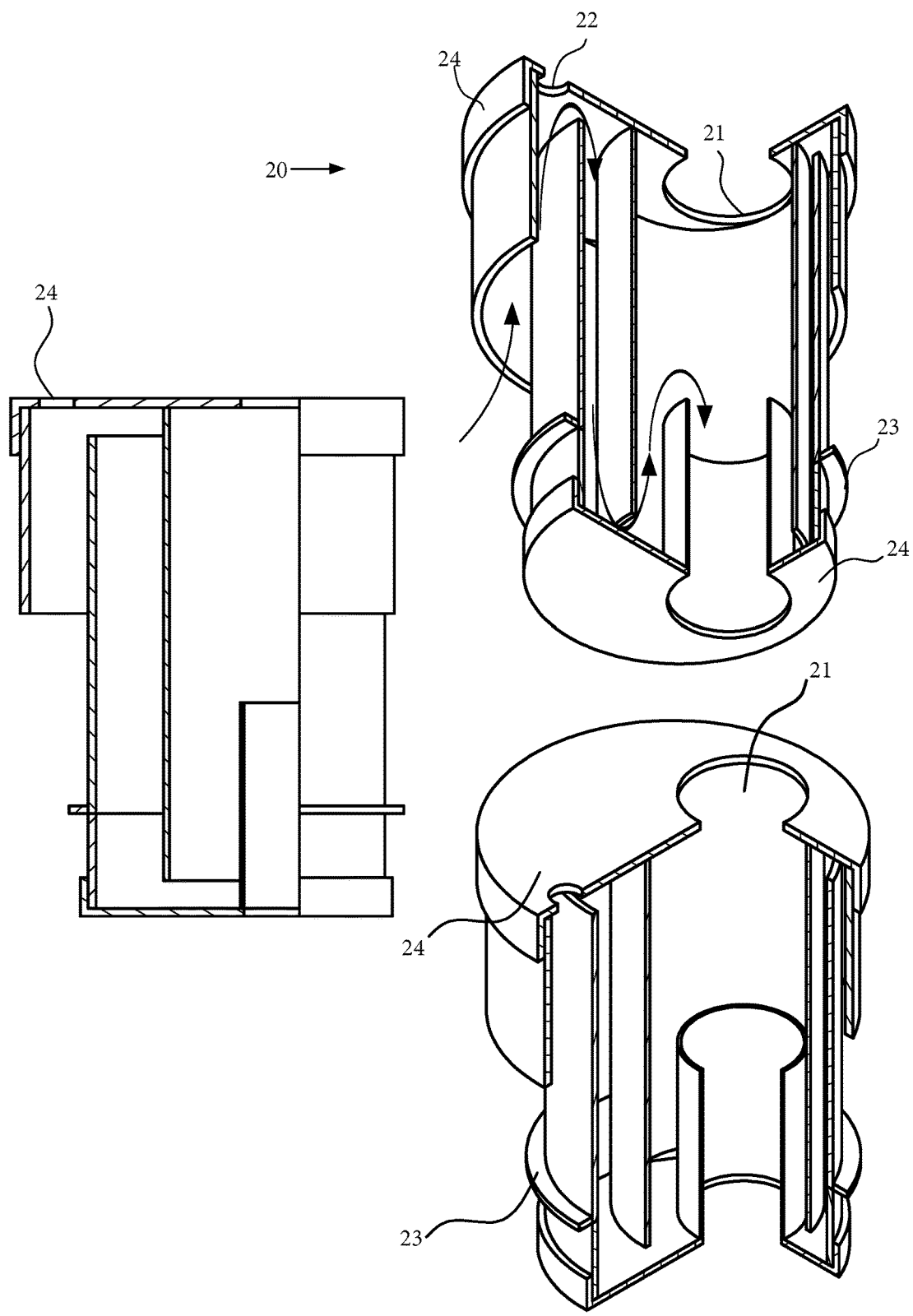

FIG. 6. is a perspective view of the feed-valve of FIG. 5

FIG. 7 shows a cross-section of the filter modules stapled on top of each other by means of vertical pipe sections.

Before going into the details of the drawings, it should be noted that the representation of scale for any component in the figures does not reflect a real size since they are schematically meant only.

Figure 1:
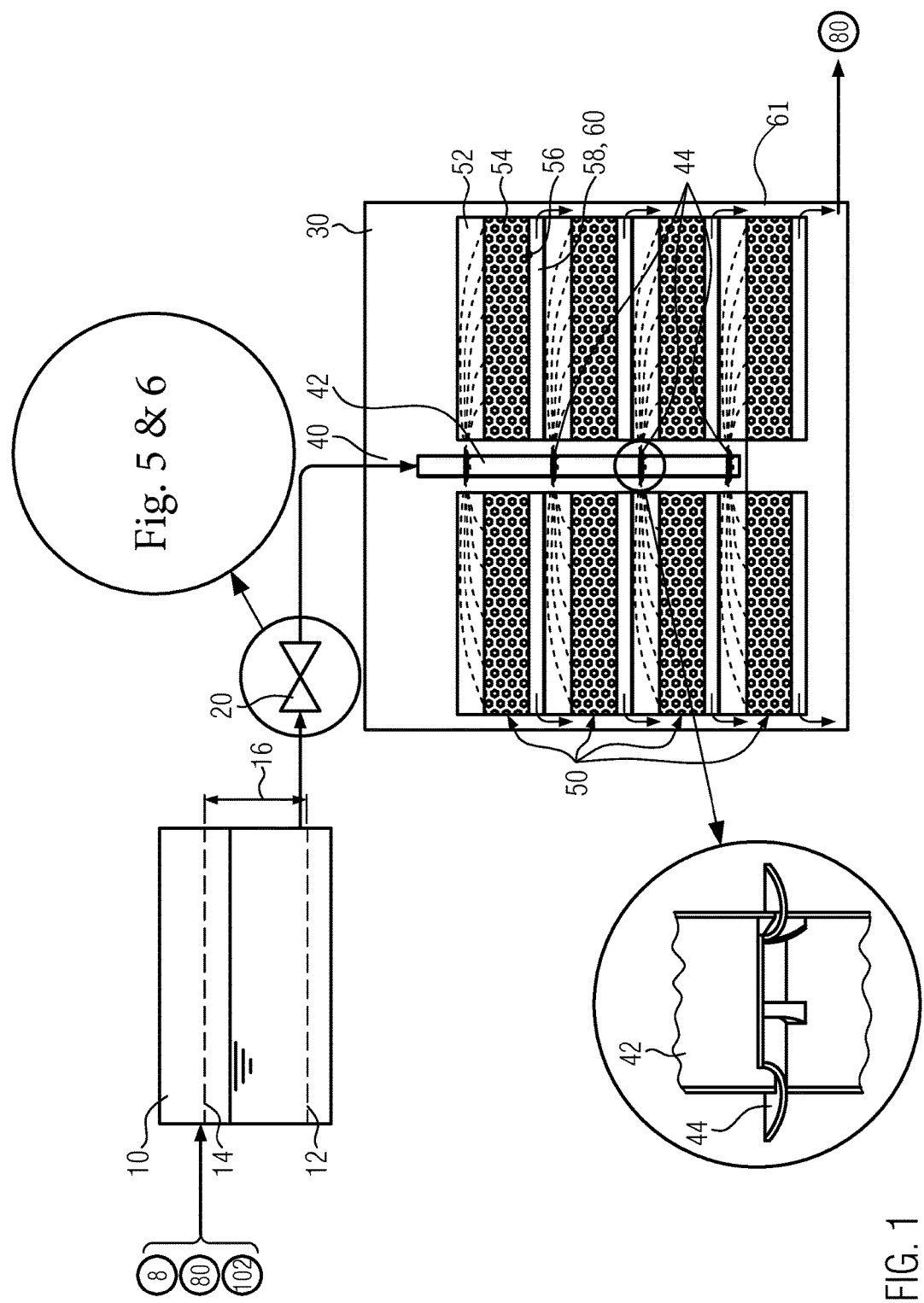

As this is to be seen in FIG. 1, the wastewater treatment plant of the invention comprises a feed-reservoir 10 which receives wastewater from an influent, possibly from a primary treatment 8, from a recirculation of a drainage storage container 80 or a pressure accumulator 102. The feed-reservoir 10 is dimensioned to accommodate a convenient volume of wastewater which volume is adapted in dependency of the capacity of the sum of filter-modules 50 which are arranged downstream the feed-reservoir. Within said feed-reservoir there is defined a minimum water level 12 which is decisive for the altitude-location of the reservoir in relation to the reactor module 30, comprising an entity of filter-modules. The reason lies in that according to the invention the force for transporting the wastewater from the feed-reservoir to the main reactor is accomplished by gravitational force only. Therefore, the way from the feed-reservoir to the main reactor must be a declining or free-fall line. Further, there is also defined a maximum water level 14 within the feed-reservoir 10 which along with the minimum water level 12 dictates a comfort volume 16 of wastewater which can be buffered within the feed-reservoir 10.

In between the free-fall line starting from the feed-reservoir 10 to the reactor module 30 there is interconnected a feed-valve 20. The feed-valve aims to produce a gush of wastewater being fed into the reactor module 30 and thus onto each filter-module, respectively. Only by means of a sufficient strong gush of water necessary flow velocities can be achieved which are needed for an optimal ejection and distribution of water by spilling or sprinkling the same onto the respective filter-modules.

To control the feed-valve 20 into an opened and closed state there is provided an air-inlet 22 with which an air-barrier can be produced inside the valve. When opening the feed-valve by suction of said air out of the valve a gush of water passes through the feed-valve due to the total pressure of the wastewater caused by the filling level of the feed-reservoir and the declining slope towards the feed-valve, and further on by gravitational force into the feeding element 40. The feeding element 40 comprises a downspout 42 from which the wastewater is transported onto several deflectors 44 which distribute the wastewater to be purified onto the respective filter-modules 50. Every filter-module comprises an air space 52 in which the wastewater is distributed onto a filter substrate 54 laying beneath. At the bottom of the filter substrate 54 there is arranged a textile 56 having a mesh size small enough to prevent the substrate from permeating. The lowest section of a filter-module provides a drainage layer 60 comprising a layer of mesh cloth. Every drainage layer 60 opens into a gathering drainage channel for the filtered water.

In the result, all the filtered water coming from any filter-module is united within the reactor module 30—what is realised according to the shown embodiment at the inner side of the circumferential wall of the reactor module 30. From there, the filtered water is then conveyed further to for example a drainage storage container 80.

Figure 2:
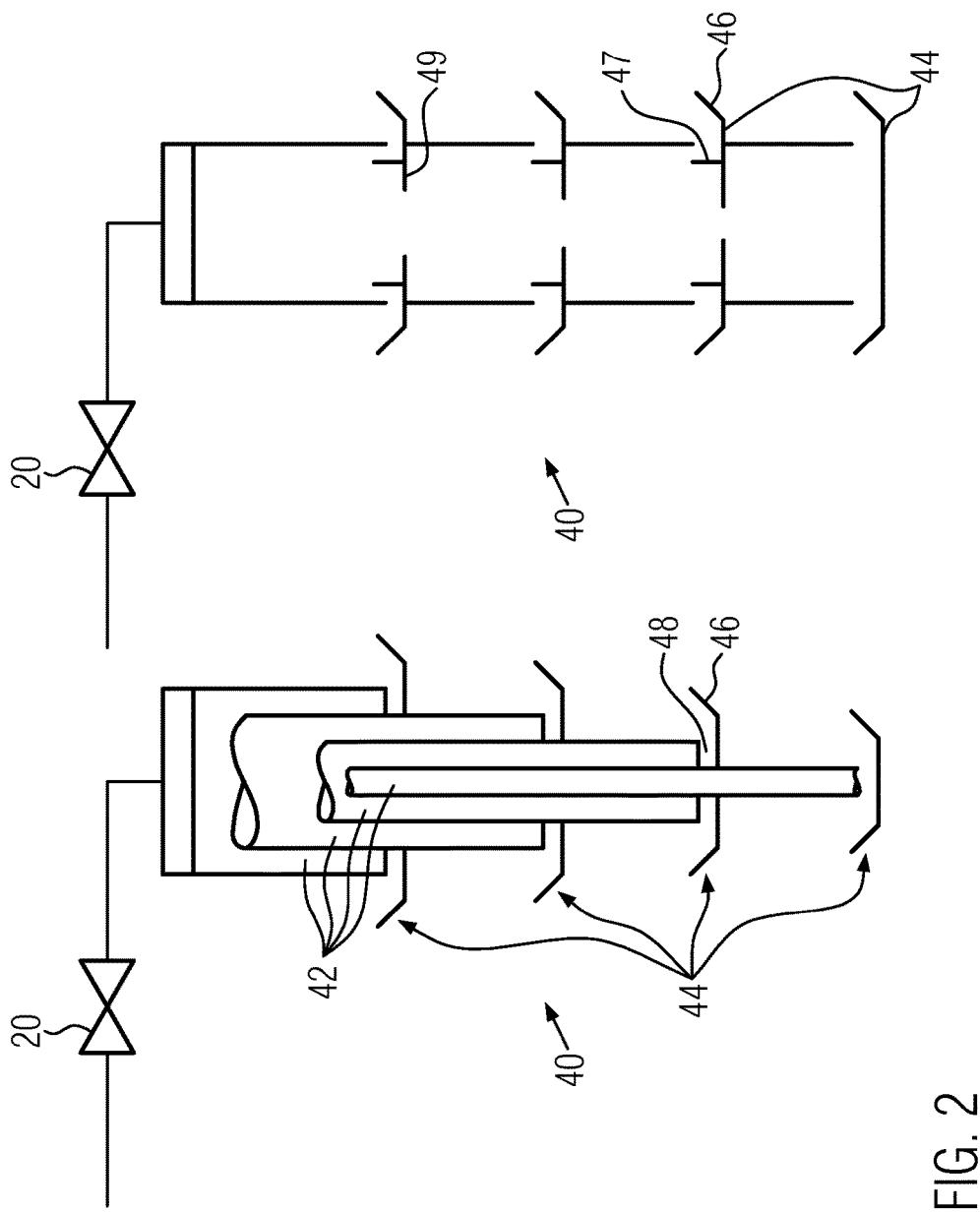
FIG. 2 shows different convenient embodiments of the feeding element.

FIG. 2 now shows two exemplifying different embodiments of the feed-element: On the left hand side it is shown a feed-element having arranged a pipe-in-pipe-construction with interleaved pipes. Around every single pipe which constitutes a downspout 42 for a respective filter-module, there is a deflector 44 fixed at said pipe. Between the outlet of any downspout 42 and the respective deflector 44 a gap 48 is provided through which the wastewater is led into the respective filter module. According to the edge 46 of each deflector a sprinkling angle is defined which is decisive for distributing the wastewater over the whole filter-module-plane, respectively.

According to the right hand embodiment of FIG. 2, there is a single-pipe-construction of a feeding element 40. The deflectors 44 shown therein are fixed to the downspout-pipe such that an inner area of each deflector extends towards the centre line of the downspout-pipe and therewith creates a baffle-element, meaning to be of a specific resistance for the further way of flow down. Within said inner area of each baffle there is left a hole through which wastewater can pass further down to be transported to the next following deflector and/or baffle. It is to be noted that the hole being formed in any baffle is determined by a specifically needed reduction 49 of the baffle cross section. Starting from the uppermost baffle to the lowest one, said clearance hole is reduced more and more. Additionally there is a convenient stop ridge 47 which is used to create an impact pressure in front of the gap 48. It is used to control the amount of wastewater passing onto the respective deflector. Here again, the edge 46 of each deflector defines the angle of launching the wastewater onto the respective filter-module.

Figure 3:
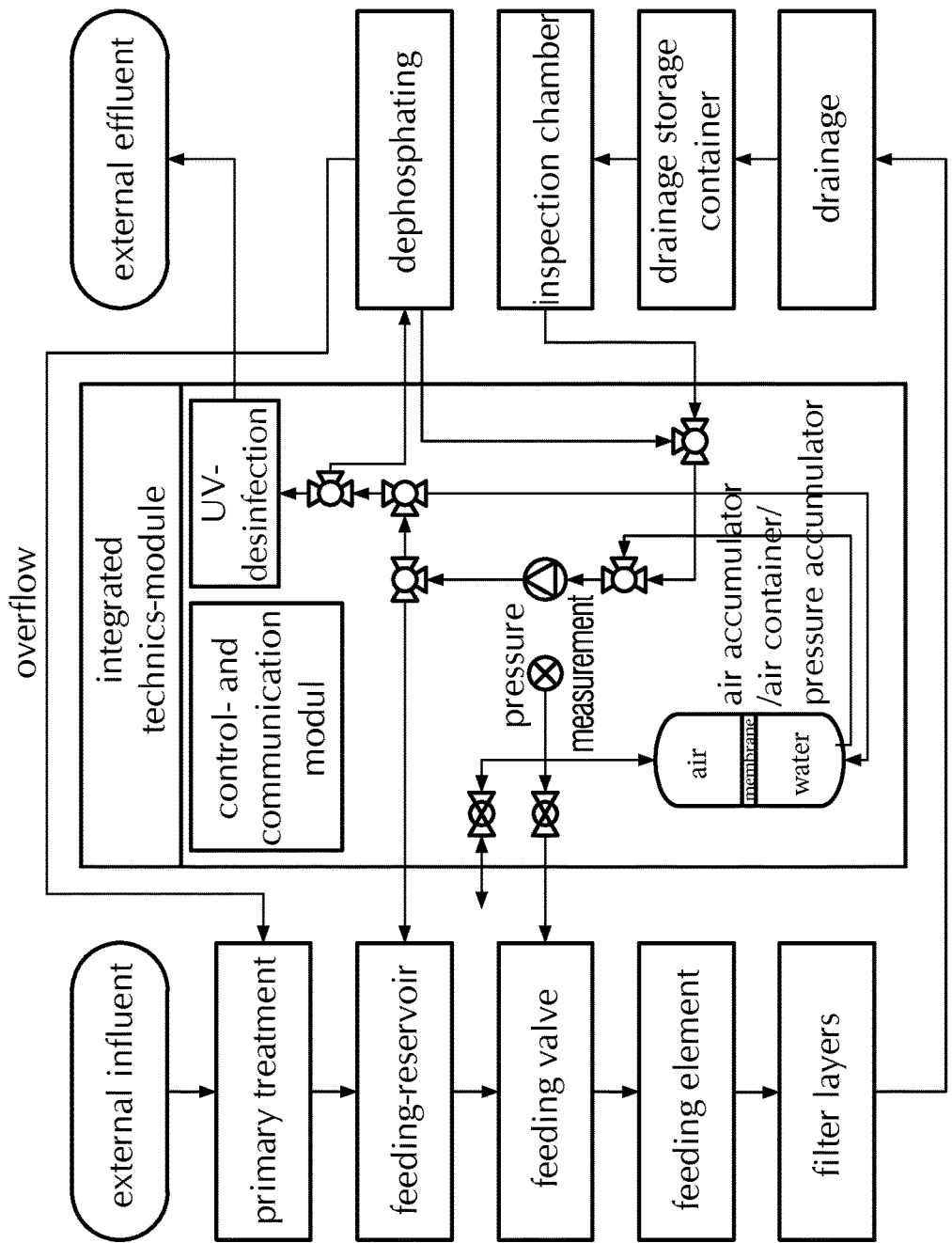
FIG. 3 is a flow chart of components of the wastewater treatment plant.

FIG. 3 is a flow chart which in a self-explanatory manner elucidates the interaction and operation of the specific components of the wastewater treatment plant.

Figure 4:
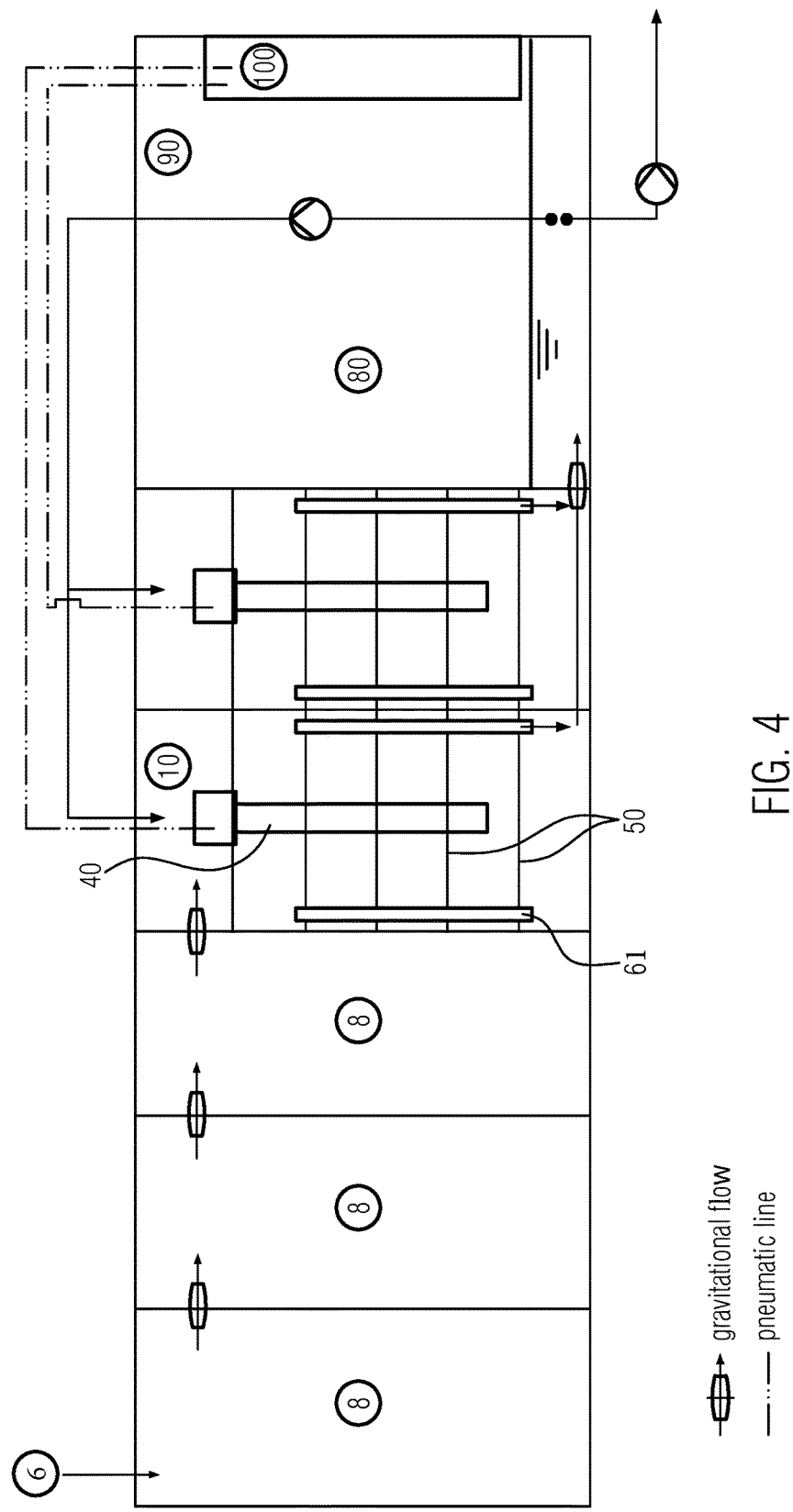
FIG. 4 shows a structural unit of the wastewater treatment plant including a primary treatment, a drainage storage container and an inspection chamber.

FIG. 4 shows a structural unit of the wastewater treatment plant including a primary treatment 8, a drainage storage container 80 and an inspection chamber 90 including a technics-module 100.

The primary treatment 8 into which wastewater enters from an influent 6 encompasses three primary stages which are interconnected by a free-fall line. Said primary treatment aims a buffering of the wastewater to be purified, a sedimentation of solid particles as also a floatation of light weight substances. From the last stage of the primary treatment 8 the wastewater then flows by gravitational force into the feed-reservoir 10. In the present case shown in FIG. 4 there are two reservoirs allocated to two reactor modules 30 in toto, each comprising a respective number of filter-modules 50. Since both the feed-reservoirs are hydraulically connected with each other, one could deem them in their function also a single feed-reservoir.

According to the shown embodiment, both the feed-reservoirs 10 are arranged directly above the main reactors 30, respectively. This makes it possible in a very suitable way to use a feed-valve which is shown in FIG. 5 (see below).

From both these reactors the purified water is then further fed by free-fall and thus gravitational force into the drainage storage container 80. According to the shown embodiment, the drainage storage container 80 and the inspection chamber 90 is one and the same container combining these elements together. Within the latter there is arranged the technics-module 100 accommodating all the control and pneumatic equipment. From said combined container the purified wastewater runs out by an external effluent or alternatively to a dephosphating stage which is within the inspection chamber, too. Additional and or optional the water in the drainage storage container 80 or the inspection chamber 90 can be pumped back into the feed-reservoir or directly into the feed-element and thus is recirculated into the main reactor or the main reactors.

FIG. 5 discloses an embodiment of a convenient feed-valve 20 being of a construction according to which several pipes are interleaved with specific and different height- and diameter dimensions so that a plurality of overflows are provided. Said construction encompasses also an air-inlet and air-outlet to create an air barrier in the form of an air-cushion for closing and opening the valve. The lower drawing shows the valve from above.

The construction shows four pipes in all (however the general concept of it is not restricted to the number of four pipes). The diameter of each pipe is chosen such that a flow cross-section is equal and maintained through the whole flow path along the valve. The pipes as shown are interleaved non-concentrically but they could even be interleaved concentrically. At the top of the valve an upper closing cover 24 is shown which closes the valve except an air-inlet and -outlet 22 (see also FIG. 6) being provided therein. When air is fed into the valve an air cushion is formed at the inner side of the valve beneath the cover 24 and encompassed by the interleaved pipes. Dependant from an arising amount and pressure of the air fed in, the cushion can vary in its thickness. Reference numeral 21 designates an opening in the upper cover 24, which opening aims an overflow for the valve. Said opening is optional in view of the functioning of the valve for a batchwise feed of wastewater. The opening aims a convenient overflow-function and an aeration-function.

At the bottom of the valve there is a closing cover 24, too, which includes an outlet-opening having the same dimension as the smallest pipe from which the water leaves the valve. The arrows shown in the drawing do disclose the flow path of the water through the valve. Reference number 23 designates a supporting collar by means of which the feed-valve can be placed in the feed-reservoir (not shown in FIG. 5). Taking for example the construction of the wastewater plant of FIG. 4, i.e. a case where the feed-reservoir is arranged directly above the main reactor, the feed-valve of FIG. 5 can be suitably installed in the bottom wall of the feed-reservoir. To this end, a clearance hole is provided in the bottom wall, in which the feed-valve is plugged in till the supporting collar sits firmly on a close fit, meaning that said close fit seals the passage from the feed-reservoir to the feed-element below.

FIG. 6 is a perspective view of the feed-valve as shown in FIG. 5. However, the air-inlet opening 22 is at different location. Therewith, the understanding of the functioning is enhanced. This is i.a. true for the function of the aeration-opening 21, which also functions as an emergency overflow. In case the valve would not open properly—maybe due to a malfunction of drawing out the air cushion (which is needed for closing the valve)—the wastewater would nevertheless be able to leave the feed-valve into the feed-element via the aeration-opening 21 and further into the reactor. Therewith, a risk is obviated that any wastewater is damming or retaining back to the household feeding its wastewater into the feed-reservoir.

FIG. 7 shows a cross-section of the filter modules 50 without the substrate being shown. They are stapled on top of each other by means of vertical pipe sections 62 forming a drainage channel 61 as mentioned as a best mode in section D. Here two vertical pipe sections 62 are shown, the right one of them in cut view. They serve the function of statics, drainage and aeration. In the detailed view, the intermediate spacer 63 is shown which guides the pipe section to its correct site as well as realizes the run-off of the waste water and the aeration from the drainage layer 60 to the pipe section.

REFERENCE NUMERALS 6 influent
8 primary treatment
10 feed-reservoir
12 minimum level of the feed-reservoir
14 maximum level of the feed-reservoir
16 comfort volume water level
20 feeding valve
21 overflow opening
22 air-inlet and -outlet of the feeding valve
23 supporting collar
24 closing cover
30 reactor module
40 feed-element
42 downspout
44 deflector
46 deflector edge of deflector
47 stop ridge
48 gap between downspout outlet and deflector
49 baffle plate for reduction of cross-section
50 filter-module
52 air space of the filter-module
54 filter substrate
56 geotextile
58 mesh
60 drainage layer
61 drainage channel
62 vertical pipe section
63 intermediate spacer
64 opening to drainage
80 drainage storage container
90 inspection chamber
100 technics-module
102 air container/pressure accumulator

The invention claimed is:

1. A wastewater treatment plant, comprising:
a main reactor module;
a plurality of filter modules arranged one below the other within the main reactor module; and
a feed element arranged centrally within the main reactor module, the feed element comprising a
downspout through which waste water flows downwardly by gravitational force and
a plurality of deflectors, one or more deflectors being associated with each filter module and in fluid communication with the downspout, the deflectors being configured to deflect the downwardly flowing wastewater sideways and upwardly to sprinkle the waste water through an air space onto the respective filter module around the feed element,
wherein the plurality of deflectors include an upper deflector and a lower deflector, and
wherein the upper deflector comprises an opening through which wastewater passes onto the lower deflector.

2. The wastewater treatment plant according to claim 1, wherein a diameter of the opening of the upper deflector is larger than a diameter of the opening of the lower deflector.

3. The wastewater treatment plant according to claim 1, further comprising:
a feed reservoir; and
a feed valve, the feed valve being arranged between and in fluid communication with the feed reservoir and the feed element,
wherein the feed valve is configured to feed wastewater from the feed reservoir to the feed element in batches.

4. The wastewater treatment plant according to claim 3, wherein a primary treatment plant is connected upstream of the feed reservoir, the primary treatment plant being configured to provide
a) a buffering of wastewater to the feed reservoir,
b) a sedimentation of solid matter, and
c) a flotation of fat-substances.

5. The wastewater treatment plant according to claim 4, wherein the feed valve comprises a plurality of interleaved pipes of subsequently smaller diameter, including an outer pipe, an outer intermediate pipe, an inner intermediate pipe, and an inner pipe,
wherein upper ends of the outer pipe and the inner intermediate pipe are connected to an upper cover,
wherein lower ends of the outer intermediate pipe and the inner pipe are connected to a lower cover, and
wherein a flow path between the interleaved pipes, the upper cover, and the lower cover has an essentially constant cross-sectional area through the feed valve.

6. The wastewater treatment plant according to claim 5, wherein an air inlet is provided,
wherein the air inlet is connected to a ventilation device, and
wherein a flow of fluid through the feed valve is controlled by adding and removing air through the air inlet to create and destroy an air barrier within the feed valve.

7. The wastewater treatment plant according to claim 1, wherein each of the plurality of filter modules comprises
an intermediate filter substrate and
a lower drainage layer.

8. The wastewater treatment plant according to claim 7, wherein a geotextile separates the intermediate filter substrate from the drainage layer and
wherein a mesh cloth forms the drainage channel.

9. The wastewater treatment plant according to claim 1, further comprising an inspection chamber with an integrated technics-module.

10. The wastewater treatment plant according to claim 1, further comprising a drainage storage container connected downstream of the main reactor module for gathering purified wastewater and buffering the same.

11. The wastewater treatment plant according to claim 10, further comprising an inspection chamber with an integrated technics-module,
wherein the drainage storage container and the inspection chamber are combined within a single reservoir.

12. A method for treating wastewater in a wastewater treatment plant,
comprising:
providing the wastewater treatment plant as in claim 1; and
feeding temporary gushes of wastewater to the feed element to charge the plurality of filter modules.

13. The method according to claim 12,
wherein the temporary gushes of wastewater are fed from a feed reservoir to the feed element through a supply line by gravitational force, and
wherein feeding temporary gushes of wastewater to the feed element is controlled by a feed-valve which is provided between the feed reservoir and the main reactor module.

14. The method according to claim 13, further comprising:
monitoring a total pressure at the feed valve.

15. The method according to claim 13, further comprising:

monitoring a water level in the feed reservoir by measuring an air pressure of an air barrier in the feed valve.

\* \* \* \* \*